United States Patent Office 3,447,682
Patented June 3, 1969

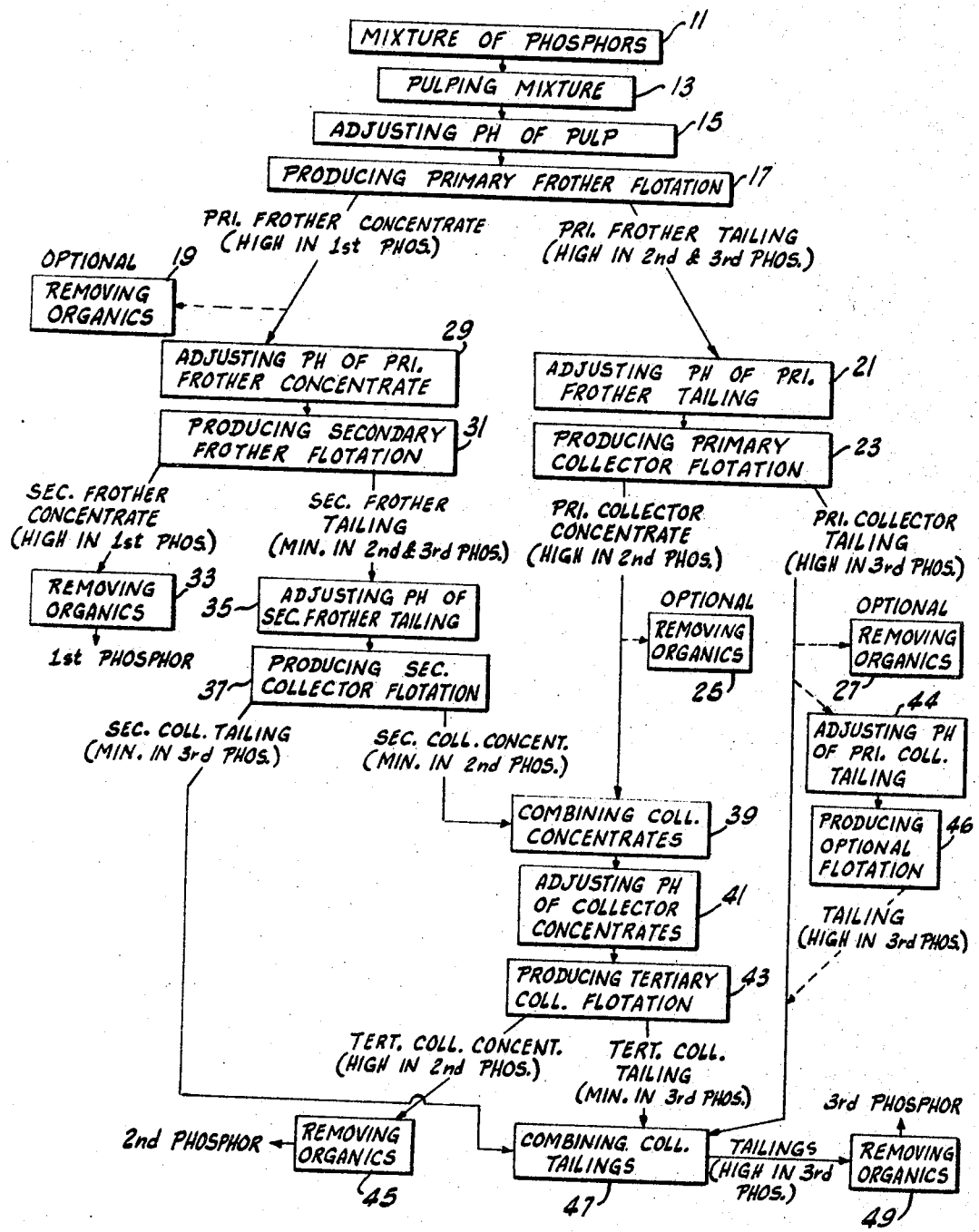

3,447,682
METHOD FOR SEPARATING PHOSPHORS
Robert A. Hedler and Winslow E. Ryan, Seneca Falls, N.Y., assignors to Sylvania Electric Products Inc., a corporation of Delaware
Filed July 3, 1967, Ser. No. 650,985
Int. Cl. B03d 1/14
U.S. Cl. 209—167     8 Claims

ABSTRACT OF THE DISCLOSURE

A method for nondestructively separating individual phosphors from a mixture of at least first and second separable phosphors wherein the composition and luminescent properties of the respective phosphors are not substantially affected. The mixture is pulped with water to form a slurry and treated with an organic flotation agent having an affinity for the first phosphor to substantially remove the first phosphor as a concentrate. The second phosphor is substantially contained in the tailing and may be further treated by flotation techniques to effect further separation.

Background of the invention

Color cathode ray tubes conventionally employ a source of electrons and a related cathodoluminescent screen responsive to electron impingement. Screens of this nature are generally comprised of a plurality of discretely patterned phosphor groups consisting of bars, stripes, or dots of specific fluorescent materials which, upon electron excitation, produce specific colors such as blue, green and red respectively.

A cathodoluminescent screen of the aforementioned type may be fabricated by one of several known processes. One such method relates to a dry powder or dusting technique wherein powdered phosphor particles are applied or settled from a confined phosphor-laden atmosphere onto a layer of moist photosensitive resist material disposed on the inner surface of the cathode ray tube viewing panel. By light exposure, through a foraminous mask positioned adjacent the phosphor-resist covered panel, multiple areas of phosphor are attached by light-activated polymerization of the photoresist material to form a photo-patterned screen comprising a multiplicity of discrete areas of the particular phosphor. The phosphor particles applied to the resist material on the unexposed intervening areas of the screen are unattached since the photoresist associated therewith is unpolymerized. Thus, the phosphor and photoresist are easily and desirably removed by a subsequent developing operation which dissolves and rinses away the unexposed photoresist carrying with it the unadhered phosphor material. This procedure is repeated for each of the color phosphors selectively disposed in the fabrication of the plural-color patterned screen. Upon completion, the screen is conventionally backed by an aluminum coating to enhance the luminescent brightness of the screen when the phosphors are excited.

In the dry powder technique, only a fraction of each specific phosphor material, applied in the initial screening operation, remains as an integral part of the finished screen. The nature of the deposition is such that a considerable amount of the phosphor material is exhausted in the form of phosphor-laden atmosphere at the completion of each deposition step. Additionally, a large portion of the applied phosphor material, which is associated with unpolymerized photoresist material, is washed away at developing. During deposition of the several related phosphor patterns, portions of previously applied phosphor may be rinsed away during subsequent developing thereby forming a mixture of surplus phosphors which are suitably trapped or collected.

Another method for forming color cathodoluminescent screens is by the wet or slurry technique wherein a respective phosphor is mixed with the photoresist material and disposed as a liquid slurry coating on the panel. After exposure development, the wet disposed phosphor screen pattern is consummated in a manner similar to that utilized for the aforedescribed dry powder formed screens. The surplus phosphors removed during development of the several exposed patterns of the slurry disposed screen likewise represent appreciable accumulations of materials, many of which are in the form of mixtures comprising varying proportions of two or more phosphor materials.

Furthermore, regardless of the technique used for forming the screen, the respective phosphors contained in imperfectly screened patterns, unacceptable finished composite screens and tube rejects, amount to additional sizable quantities of mixed phosphor materials which represent considerable monetary value, especially when certain of the phosphors contain expensive rare earth materials. Thus, the reclamation of the respective phosphors is a desirable consideration. One method for reclaiming a rare earth phosphor from a mixture of sulfide phosphors involves a mineral acid technique wherein the sulfide phosphors are destroyed per se and removed as products of decomposition. Furthermore, in some instances, a small portion of the rare earth phosphor is also decomposed by the acid treatment. There has been no economically desirable method for nondestructively separating a mixture of the aforementioned types of phosphors.

Objects and summary of the invention

It is an object of the invention to reduce the aforementioned disadvantages and to provide an efficient method for nondestructively separating mixed phosphors encountered in cathode ray tube manufacturing.

Another object is to provide a method for separating the mixed phosphors resultant from screen and tube rejects.

The foregoing objects are achieved in one aspect of the invention by utilizing a method wherein at least two mixed phosphors are separated without affecting the composition or the luminescent properties of the respective phosphors. The method comprises pulping the phosphor mixture to form a water slurry which is treated with an organic flotation agent in conjunction with agitation and aeration to form a concentrate containing a major portion of a first phosphor and a tailing containing a major portion of a second phosphor. This is followed by separating the first phosphor from the concentrate and the second phosphor from the tailing.

Brief description of the drawing

The drawing comprises a flow sheet illustrating one embodiment of the method.

Description of the preferred embodiment

For a better understanding of the present invention, together with other and further objects, advantages and capabilities thereof, reference is made to the following specification and appended claims in connection with the aforedescribed drawing.

In referring to the drawing, there is shown by way of example a flow diagram illustrating an embodiment of a method for separating mixed phosphors. While this method is applicable to separating various types of mixed phosphors, in this instance, the separation of a mixture of cathodoluminescent phosphors will be considered.

The mixture of phosphors as indicated in block 11 is preferably a noncontaminated mixture of at least first and second separable phosphors. Contaminating materials, inherent to the stage of accumulation, are removed from the mixed phosphors by suitable means; for example, certain large particles of foreign matter can be removed by sieving, water-soluble photoresist material can be removed by rinsing, minute particles of polymerized photoresist can be removed by baking and flake aluminum by treatment with caustic soda followed by rinsing. This latter caustic soda treatment can also be utilized to remove the silica coating from the phosphor particles if such is desired.

It has been discovered that the cleansed mixture of two or more phosphors can be successfully and nondestructively separated by a special flotation technique of which the internal mechanics appear to be complex; consequently there is much speculations as to what actually takes place. A water slurry of the mixture of phosphors is formed, agitated, aerated, and treated or conditioned with an organic flotation agent that manifests a surface affinity for at least one of the phosphors in the mixture. The principle flotation agents are classified as either frothers or collectors. It has been found that both promote surface phenomena on particles of different materials. Since much conjecture exists as to the actual surface interaction between the respective agents and specific phosphor particles no detailed theorization will be presented. It is thought that frothers, in particular, lower the surface tension of the water component of the slurry. Both agents are believed to form hydrophobic surface films on individual phosphor components which promote particle adherence to the air bubbles resultant of aeration. These bubbles, with the phosphor particles adhered thereto, rise to the surface of the agitated slurry and form a froth on the surface thereof. This froth, which contains a major portion of the first phosphor, usually contains some entrapped but unadhered additional phosphor material. The residual or tailing material of the flotation contains the major portion of the second phosphor component of the mixture. Further reclamation is effected by separating the first phosphor from the froth material and the second phosphor from the tailing material.

In greater detail, the mixture of phosphors as indicated in block 11 can be a mixture of several individual color-emitting cathodoluminescent phosphors, for example: a first blue-emitting zinc sulfide phosphor, a second complex sulfide phosphor such as green-emitting zinc-cadmium sulfide, and a third red-emitting rare earth phosphor such as yttrium vanadate. These mixed phosphors, which have been cleaned of noncontaminating materials, are made into a slurry pulp as per block 13 by adding pure water thereto with the resultant slurry being in the range of about twenty to forty percent solids. The batch size of the pulping is determined by the equipment, handling facilities and physical ability to maintain chemical regulation. The pH value of the slurry is adjusted, as noted in block 15, to be of an acidic value. Since pH 7 is considered as neutral, the pH value in this instance is less than 6 being preferably in the pH 4 to pH 2 range. This is accomplished by agitating the slurry and introducing the required amount of pH modifier, such as sulfuric acid, thereto.

To produce the flotation, a conventional flotation machine may be utilized; wherein there is means for mechanical agitation of the pulp slurry and means for introducing air or gas into the agitated slurry. As used herein, the phrase "producing a flotation" will include the adjuncts of agitation and aeration.

With the acid slurry accommodated within a suitable container, wherein there are means for agitation and aeration, a primary flotation is produced, as per block 17, by treating the pulp with a compatible organic flotation agent to form a separation comprising a major portion of one of the sulfur containing phosphors. It has been found that when a flotation agent in the form of a frother alcohol, such as methyl isobutyl carbinol, is added to the acid slurry in the amount of about 0.12 pound per ton of slurry solids, the blue-emitting zinc sulfide phosphor is affected in a manner that the surface characteristics of the zinc sulfide particles are altered to promote adherence to the rising bubbles. As a result, the froth which is removed from the surface of the primary frother flotation is high in a first or zinc sulfide phosphor material. Consequently, this froth upon decomposition yields a phosphor-containing concentrate. If the zinc sulfide contained in the primary concentrate is of a satisfactory purity, i.e., free of detracting amounts of the other phosphors comprising the mixture, the concentrate may be subjected to an optional organic removal step, as per block 19, to remove the organic frother agent which may be present. An example of such removal is by baking the concentrate at a temperature of 400 to 450 degrees centigrade for a time period sufficient to decompose and volatilize the organics. It has been found that more than ninety-five percent by weight of the zinc sulfide phosphor contained in the mixture is removed in the primary frother concentrate. Other phosphors present in this concentrate are less than five percent by weight of the concentrate.

The residual or tailing material of the primary frother flotation is high in the second and third phosphors, green-emitting zinc-cadmium sulfide and red-emitting yttrium vanadate respectively. Separation of these phosphors involves adjusting the pH of the primary frother tailing, as per block 21, to the acidic pH 4 to pH 2 range, and then producing a primary collector flotation as indicated in block 23. This flotation is brought about by agitating, aerating, and treating the pH adjusted tailing with a collector flotation agent. The collector, which forms a hydrophobic hydrocarbon film on the surface of the zinc-cadmium sulfide particles, is a chemical composition which exhibits a particular affinity for this second phosphor, for example an xanthate, such as potassium xanthate. About 0.10 pound of this collector material is added per ton of solids. The primary collector froth and resultant concentrate removed from the surface of the primary collector flotation, as per block 23, has a high green-emitting second phosphor or zinc-cadmium sulfide content, and the primary collector residue or tailing material is high in the third or red-emitting yttrium vanadate phosphor. If the respective green and red-emitting phosphors contained in the concentrate and tailing are free of detracting amounts or other phosphors, the concentrate and the tailing may be individually subjected to optional organic removal steps, as indicated by blocks 25 and 27. Such removal can be accomplished by baking, as aforementioned, to decompose and volatilize the flotation organics present therewith. It has been found that more than ninety percent by weight of the zinc-cadmium sulfide phosphor present in the mixture is contained in the primary collector concentration, and more than ninety percent by weight of the yttrium vanadate phosphor present in the mixture is found in the primary collector tailing.

Further separation of the respective phosphors can be accomplished by utilizing further flotation steps. For example, instead of removing the organics from the primary frother concentrate, the organic removal step, per block 19, is by-passed. The pH of the concentrate is then adjusted to maintain the pH 4 to pH 2 range, as per block 29. A secondary frother flotation, as indicated by block 31, is produced with the acidic concentrate by agitation, aeration and treating with a frother agent, for example methyl isobutyl carbinol, as aforedescribed. The secondary frother concentrate resultant from this flotation represents more than ninety-five percent by weight of the blue-emitting zinc sulfide phosphor which is of greater purity, as the minute amounts of the second and third phosphors admixed therewith are appreciably retained in the second frother tailing. Flotation organics are removed from the zinc sulfide phosphor contained in the second frother concentrate, as per block 33, as for example by the aforedescribed baking procedure.

The small quantities of the second and third phosphors retained in the second frother tailing may be further separated by adjusting the pH of the tailing, per block 35, and producing a secondary collector flotation, per block 37, in the manner previously described, using for example the collector agent potassium amyl xanthate. By this flotation step, the minute amount of the second or green-emitting phosphor is substantially removed in the second collector concentrate and the minute amount of the third or red-emitting phosphor is retained in the second collector tailing.

Additional separation of the second or green-emitting zinc-cadmium sulfide phosphor from the small amount of the admixed red-emitting phosphor contained in the primary collector concentrate can be achieved by producing a further flotation step instead of practicing the optional organics removal step, per block 25. The second collector concentrate is combined with the primary collector concentrate, as indicated by block 39, and the pH of the material adjusted to the 4 to 2 range as indicated by block 41. A tertiary collector flotation is produced, as per block 43, with the combined primary and secondary collector concentrates in the manner already described to further reclaim the second phosphor and third phosphors. The tertiary collector concentrate resulting therefrom represents more than ninety-five percent by weight of the second or green-emitting zinc-cadmium sulfide phosphor contained in the mixture. Removal of the organics therefrom, per block 45, may be accomplished in the aforedescribed manner.

Combining the primary, secondary and tertiary collector tailings, as per block 47, represents more than ninety-five percent of the third or red-emitting yttrium vanadate phosphor contained in the original mixture. If desired, an optional flotation step, per block 46, with pH adjustment according to block 44, may be produced with the primary collector tailing to additionally purify the major portion of the third phosphor. Removing the organics therefrom, per block 49, yields the third phosphor separation.

Thus, it has been found that three phosphors, two sulfides and a rare earth, can be nondestructively separated from a mixture by a method that readily lends itself to commercial production techniques. Since the sulfide phosphors are not destroyed, there is a minimum of by-product materials involved. After bakng and sieving the respective phosphors are ready for re-use. The method is not to be considered limited to the flotation steps delineated as more or less flotation steps may be utilized to achieve the degree of purification results desired. In addition, a variety of rare earth phosphors other than the vanadates, such as those compositions containing oxygen and oxygen-associated elements, can be separated from other non-rare earth phosphors by this method.

If traces of the sulfide phosphors are evidenced as still being admixed with the third phosphor, as at block 49, additional flotation can be produced. Alternatively, the rare earth red-emitting phosphor may be treated, with a mineral acid such as nitric or hydrochloric, to decompose the minute quantities of sulfides, then rinsed, sieved and fired at approximately 800 degrees centigrade to remove any traces of residual sulfur that may be present.

We claim:

1. A method to provide the nondestructive separation of phosphors from a mixture of at least one sulfide phosphor and a rare earth phosphor, said method not substantially affecting the composition or the luminescent properties of the respective phosphors and comprising the steps of:

pulping said mixture of phosphors with water to form a slurry;

adjusting the pH of said pulp slurry to an acidic value of less than pH 6 by adding a pH modifier;

producing a primary flotation by treating said pH adjusted pulp slurry with a compatible frother alcohol flotation agent in conjunction with agitation and aeration to form a primary concentrate containing a major portion of said sulfide phosphor and a primary tailing containing a major portion of said rare earth phosphor; and separating said sulfide phosphor from said concentrate and said rare earth phosphor from said tailing.

2. A method according to claim 1 wherein the acidic value of said pulp slurry is substantially in the range of pH 4 to pH 2.

3. A method to provide the nondestructive separation of phosphors from a mixture of a first sulfide phosphor, a second complex sulfide phosphor and a third rare earth phosphor comprising the steps of:

pulping said mixture of phosphors with water to form a slurry; adjusting the pH of said pulp slurry to an acidic value of less than pH 6;

producing a primary frother flotation by treating said pH adjusted pulps slurry with a frother alcohol flotation agent to provide a pulp separation in the form of a primary frother concentrate containing a major portion of said first sulfide phosphor and a primary frother tailing containing major portions of said second sulfide phosphor and said rare earth phosphor;

producing a primary collector flotation by treating said primary frother tailing with a xanthate collector flotation agent to substantially provide a separation of said second sulfide phosphor in the primary collector concentrate and said third rare earth phosphor in the primary collector tailing of said flotation; and removing flotation organics from said separated first, second and third phosphors.

4. A method according to claim 3 wherein said first phosphor is zinc sulfide, said second phosphor is zinc-cadmium sulfide, and said third phosphor is yttrium vanadate.

5. A method according to claim 3 wherein said rare earth phosphor is a rare earth element in combination with materials selected from the group comprising: vanadates, oxides, and oxygen associated elements.

6. A method to produce the nondestructive separation of phosphor from a mixture of a first sulfide phosphor, a second complex sulfide phosphor and a third rare earth phosphor comprising the steps of:

pulping said mixture of phosphors with water to form a slurry;

adjusting the pH of said pulp slurry to an acidic value of less than pH 6;

producing a primary frother flotation by treating said pH adjusted pulps slurry with a frother alcohol flotation agent to provide a pulp separation in the form of a primary frother concentrate containing a major portion of said first sulfide phosphor and a primary frother tailing containing major portions of second sulfide phosphor and said rare earth phosphor;

producing a secondary frother flotation by treating said primary frother concentrate with a frother alcohol flotation agent to form a secondary frother concentrate containing said major portion of said first sulfide phosphor and a secondary frother tailing containing minute amounts of said second sulfide and said third rare earth phosphors;

producing a secondary collector flotation by treating said secondary frother tailing with a xanthate collector flotation agent to form a secondary collector concentrate substantially containing said minute amount of said second sulfide phosphor and a secondary collector tailing containing said minute amount of said third rare earth phosphor;

producing a primary collector flotation by treating said primary frother tailing with a xanthate collector flotation agent to substantially provide a separation of said second sulfide phosphor in the primary collector concentrate and said third rare earth phosphor in the primary collector tailing of said flotation;

producing a tertiary collector flotation by treating said primary and secondary collector concentrates with a xanthate collector flotation agent to further reclaim said second sulfide phosphor as a concentrate and said third rare earth phosphor as a tailing; and removing flotation organics from said separated first, second and third phosphors.

7. A method according to claim 6 wherein the slurry materials treated in the several flotation steps are adjusted to be acidic prior to flotation treatment in substantially the range of pH 4 to pH 2.

8. A method to provide the nondestructive separation of phosphors from a mixture of at least a first sulfide phosphor and a second complex sulfide phosphor, said method not substantially affecting the composition or the luminescent properties of the respective phosphors and comprising the steps of:

pulping said mixture of phosphors with water to form a slurry;

adjusting the pH of said pulp slurry to an acidic value of less than pH 6 by adding a pH modifier;

producing a primary flotation by treating said pH adjusted pulp slurry with a compatible frother alcohol flotation agent in conjunction with agitation and aeration to form a primary concentrate containing a major portion of said first sulfide phosphor and a primary tailing containing a major portion of said second complex sulfide phosphor; and separating said first sulfide phosphor from said concentrate and said second complex sulfide phosphor from said tailing.

References Cited

UNITED STATES PATENTS

| | | | |
|---|---|---|---|
| 1,182,890 | 5/1916 | Bradford | 209—167 |
| 1,260,668 | 3/1918 | Hebbard | 209—167 |
| 2,373,305 | 4/1945 | Gieseke | 209—167 |
| 3,054,746 | 9/1962 | Gaden | 209—166 X |
| 3,054,747 | 9/1962 | Gaden | 209—166 X |

FRANK W. LUTTER, *Primary Examiner.*

R. HALPER, *Assistant Examiner.*

PO-1050
(5/69)

UNITED STATES PATENT OFFICE
CERTIFICATE OF CORRECTION

Patent No. 3,447,682          Dated June 3, 1969

Inventor(s) Robert A. Hedler and Winslow E. Ryan

It is certified that error appears in the above-identified patent and that said Letters Patent are hereby corrected as shown below:

Column 4, lines 38 and 39 of the specification "Potassium xanthate" should read ---potassium amyl xanthate---.

Column 4, line 48 of the specification "or" should read ---of---.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents